Aug. 6, 1968  W. G. YOUNG ET AL  3,395,940
LATERAL AUGERING MINER WITH A FLAT LOOP CONVEYOR
Filed May 6, 1965  6 Sheets-Sheet 1

INVENTORS
WILLIAM G. YOUNG &
FREDERICK G. HORNING
BY
CAROTHERS AND CAROTHERS
THEIR ATTORNEYS

INVENTORS
WILLIAM G. YOUNG &
FREDERICK G. HORNING
BY CAROTHERS AND CAROTHERS
THEIR ATTORNEYS

Aug. 6, 1968   W. G. YOUNG ET AL   3,395,940
LATERAL AUGERING MINER WITH A FLAT LOOP CONVEYOR
Filed May 6, 1965   6 Sheets-Sheet 4

INVENTORS
WILLIAM G. YOUNG &
FREDERICK G. HORNING
BY
CAROTHERS AND CAROTHERS
THEIR ATTORNEYS

Aug. 6, 1968  W. G. YOUNG ET AL  3,395,940
LATERAL AUGERING MINER WITH A FLAT LOOP CONVEYOR
Filed May 6, 1965  6 Sheets-Sheet 6

INVENTORS
WILLIAM G. YOUNG &
FREDERICK G. HORNING
BY
CAROTHERS AND CAROTHERS
THEIR ATTORNEYS 3,395,940
LATERAL AUGERING MINER WITH A FLAT LOOP CONVEYOR
William G. Young and Frederick G. Horning, Salem, Ohio, assignors to The Salem Tool Company, Salem, Ohio, a corporation of Ohio
Filed May 6, 1965, Ser. No. 453,622
14 Claims. (Cl. 299—56)

This invention relates generally to auger mining machines and more articulately to an auger machine that is independently mobile on endless tracks and supports a laterally movable auger mining means with the mobile means supported to the rear and a hinged circular conveyor means supported to the front of the auger mining means and supporting an auger section storage.

Former lateral auger machines for deep mining were insufficiently mobile or non-flexible to properly carry on their work. This was discovered to be due to the arrangement of the frame and the construction of the machine. Every part of the machine supporting the structure necessary to carry out the mining process inhibited the free operation of another part of the combination. The end results were machines that become mere paper ideas impractical, inefficient, and therefore discarded.

The machine and mining method constituting this invention has the separate parts isolated from each other so that they may independently combine their cooperation with each other without interference and with efficiency. This is the principal object of this invention.

Another object is the provision of a mining machine that is provided with a mobile main frame that carries the heavy motor and auger power and a mid frame that underlies a transverse auger mining means and a conveyor frame pivoted to the mid frame for conveying the mined material to the front of the machine where it is discharged and hauled away from the front of the machine. The front conveyor frame is mobilized by a caster wheel and also carries the stored auger sections and it is horizontally pivoted to the mid frame. The mid frame is also horizontally pivoted to the main frame. These pivoted frames are steerable as a unit frame from the endless tracks supporting the main frame.

The three sectioned frame is pivoted between the conveyor and mid frame as a free pivot and the mid frame is adjustably pivoted to the main frame and its relative position is controlled and locked by a double acting cylinder and piston. The conveyor is a flat loop drag conveyor that encircles the perimeter of the conveyor frame with the flights attached to a single hinged conveyor chain to permit the flights to turn corners at opposite sides of the said frame and at the frame apex of the conveyor frame where it is driven. The loop conveyor thus approximates the shape of a triangle and its sides are open for hand loading.

This structural arrangement permits the auger mining means to be adjustably positioned as to elevation without interfering with the conveyor section. The conveyor section being of triangle flat loop shape with the base of the triangle guided across the back of the mid frame and the sides of the triangle extending over the pivoted connection and advancing to the conveyor discharge at the apex of the triangle. This provides a wide space under the conveyor discharge at the front of the machine to insert a shuttle car, bridge conveyor or extension belt conveyor.

The triangularly shaped conveyor on the sides of the front of the machine are convenient for cleanup crews to shovel spillage.

Another object is the provision of three frame sections; the base frame, the intermediate frame, and a front frame, the first and last of which are supported from the ground and are each hingedly attached to the intermediate frame. A conveyor being supported to travel in a flat loop in either direction across the back of the intermediate frame and passing transversely the intermediate frame at each end thereof for receiving material being mined depending upon which side of the machine the auger mining mechanism is extended. The conveyor is then made to travel from that side of the mining machine from which the auger mining mechanism is transversely extended to carry the material to discharge at the front or apex of the conveyor frame.

Another object is the provision of a transverse auger belly plate in the mid frame which covers the transverse section of a flat loop conveyor but exposes openings at the ends of the belly plate the conveyor section traversing the mid frame end to receive material as it is mined where it is taken to the apex of the conveyor and discharged. The belly plate is covered by a pair of oppositely extending guide plates which when retracted cover the conveyor openings and when one is transversely extended exposes the conveyor opening, the auger extension being power actuated to engage the face of the material being mined for the purpose of conveying the augered material to the flat loop drag conveyor.

Another object is the provision of a flat loop drag conveyor with drag arms supported from a single chain that circumvents the inside of the loop and travels around an apex in the form of an arc greater than 100°, which apex is for the discharging of material from the conveyor. The conveyor pan is open for a space of more than the 180° circumventing drag conveyor to allow ample time and a large enough opening for the mined material to escape downwardly to another conveyor means.

Another object is the provision of a flat but flexible loop drag conveyor that is substantially in the form of a triangle wherein the drag members travel along a conveyor pan that is open for the full apex in order to discharge the material, and the conveyor chain is driven at this apex in either direction depending upon which side of the mining machine the mining operation is performed.

Another object is the provision of a flat loop type conveyor of substantial triangle arrangement with substantial flat sides and a flat base, said conveyor sloping arcuately upwardly under an auger section to a higher elevation thence along the sides to discharge.

Another object is the provision of a flat loop type conveyor substantially in the form of a triangle with a flat base and straight sides wherein the three angles of the triangle follow curved paths, the apex being the discharge, and the curved paths adjacent and underneath the opposite ends of the transverse belly plate providing an improved loading section of the conveyor.

Another object is the provision of an auger storing and loading means which includes endless chain means carrying seats for supporting individual auger sections movable in a fixed path to maintain the auger sections in alignment and presentable to an auger loading mechanism provided with a seat to raise and receivably lift the auger section upwardly and projected forwardly and lowered into the auger mining mechanism and thereafter, in its lowered position, being retracted therefrom. This permits the augers to be retained within the triangle of the flat loop conveyor and loaded from one side of the machine without resorting to storage on the ground or other similar practices in the prior construction that would otherwise impede the operating of the mining mechanism in deep mining operations.

Another object is the provision of an auger mining machine having a flat loop conveyor frame with an auger storing loading mechanism in the center thereof mounted on an independent frame that is shiftable within the frame to preposition the augers from storage for loading in the auger mining machine depending upon which side the mining machine that the augers are operating.

Another object is the provision of an auger storing and loading mechanism mounted to pivot on a frame to change the direction of loading the augers and wherein the loading mechanism is pivotly supported on the frame to raise and project and lower and retract regardless of the pivotal position of the frame supporting the storage rack.

Another object is the provision of an auger mining machine for augering on opposite sides laterally of the frame and providing a transverse way of material width and a length that is substantially the width of the auger machine. A transversely moving carriage mounted on the way carrying a motor drive means overhanging one side of the way and a gear box overhanging the opposite side of the way with a coupling for engaging and rotating and feeding the auger mining mechanism in either direction, the carriage being substantially balanced in weight and having shoes on the ways to assume the thrust created by the action of augering without impeding the feed of the mining mechanism.

Another object is the provision of a dual cylinder feed of the auger mining mechanism in moving the carriage to feed the rotary auger mechanism while mining, which includes a chain secured at its intermediate point to the carriage and having its ends looped about pulleys on a pair of hydraulic pistons in cylinders which with the ends of the chains attached to the frame through a shock absorbing means to reduce the shock transmitted to the machine frame upon sudden resistance to mining by the auger mining mechanism. Such shock absorbers include a resilient material under compression with an opportunity for deformation to absorb all force except torisonal forces taken by the ways.

Other objects and advantages appear hereinafter in the following description and claims.

The accompanying drawings show for the purpose of exemplification without limiting the invention or claims thereto, certain practical embodiments illustrating the principles of this invention wherein:

Figure 1:
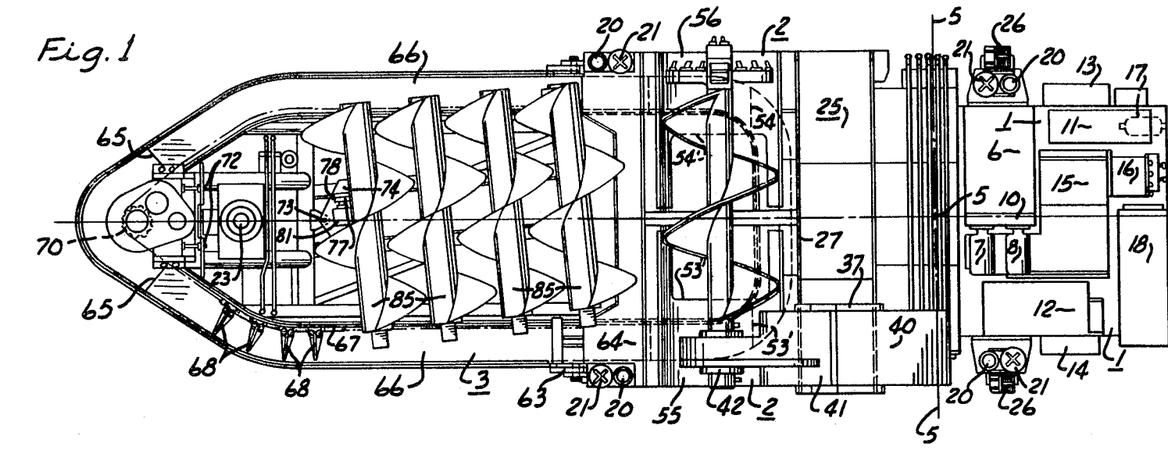
FIG. 1 is a plan view of the auger mining machine of this invention.
Figure 3:
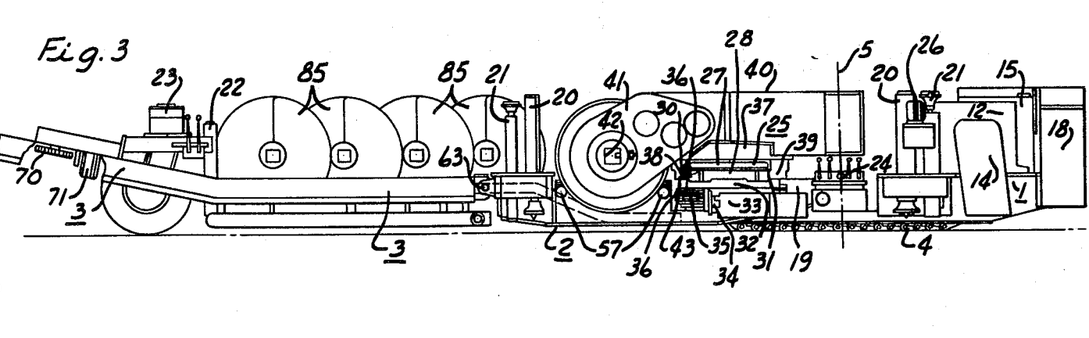
FIG. 3 is a view in side elevation of the auger mining machine.
Figure 4:
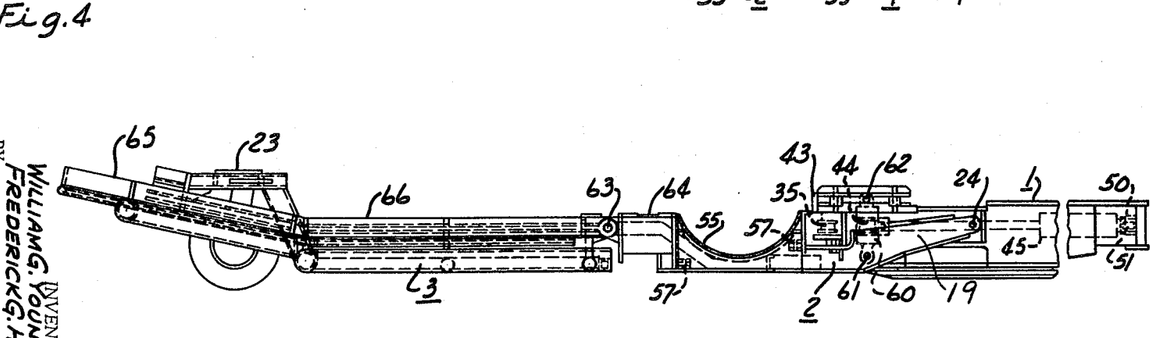
FIG. 4 is a view in side elevation of the mining machine frame.

Referring to FIGS. 1 and 4 the auger mining machine comprising this invention is a main frame 1 including a mid frame 2 and conveyor frame 3. The main frame 1 and its coupled mid frame 2 are supported on the independently operated tracks 4 which, on each side of the main frame, and the center of these tracks, is substantially at the cross center lines indicated at 5. This center point of the main frame 1 is centered within the spaced endless tracks 4 as shown in FIGS. 1 and 3. The spaced independently operated endless tracks 4 carry the propulsion motor means and tank means aft of the center point 5 wherein the electric motor 6 operating the pumps 7 and 8 through the gear train 10 provides the propulsion and feed force for the auger mining machine. The propulsion for the independently operated endless tracks is produced through the traction drive gear cases 11 and 12 which operate the respective endless drive chain under the chain guard 13 and 14. The drive chain from each of these track gear cases is arranged to drive a sprocket means over which the endless track 4 passes at one end of their endless flight. The main frame supports the hydraulic oil tank 15 intermediate the traction gear cases 12 and 13. The valve assembly 16 is mounted on the rear of the tank 15. The accumulator 17 is assembled on one side of the valve assembly and the contactor case 18 is mounted on the other side of the valve assembly 16.

Each side of the main frame 1 including the mid frame 2, is provided with a bracket for supporting the hoist and roof jack assembly as indicated at 20. The center of the lift jack 20 and the roof jack 21 are aligned at the forward portion of the mid frame 2 and there is provided on each side of the mid frame a set of hoist and roof jacks 20 and 21 respectively. The rear jacks are just aft of the center 5 of the main frame 1 and the other pair of lift jacks are midway between the entire machine although actually on the front end of the mid frame. The four lift jacks 20 will raise the main and mid frame of the machine from the ground which hoists are supplemented at the forward end by the conveyor lift cylinder 22, in order to enable lifting of the entire machine. Otherwise the conveyor weight is supported by the conveyor caster wheel 23. Thus, the conveyor frame 3 is triangularly supported and it is in fact treated as a triangular member insofar as this disclosure is concerned.

Figure 5:
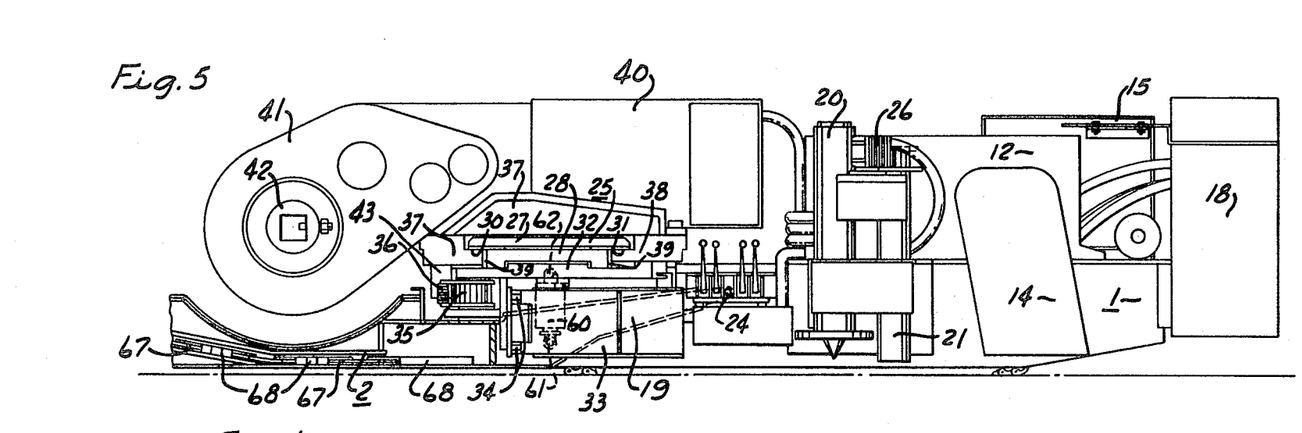
FIG. 5 is an enlarged view in side elevation of the mining machine with parts broken away to show the main frame and coupled mid frame.

The mid frame 2 includes spaced parallel arms 19 projecting rearwardly therefrom to carry the aligned pivot members 24 which pivotly support the rear end of the mid frame 2 on the main frame 1. The pivot members 24 are susbtantially aligned with a vertical plane that passes through the center point 5, the latter which is also within a vertical central plane longitudinally of the machine. The spaced arms 19 that carry the pivot points 24 are shown in FIG. 4 to the rear of the transverse way 25. This way extends to the extreme sides of the mid frame of the machine substantially in line with the outer edge of the headlights 26 mounted with the assembly of the roof and floor jacks 20 and 21. The transverse way 25 is in the form of a cap plate 27. It is wider than and extends beyond the intermediate portion 28 to form a pair of outwardly facing parallel way surfaces 30 and 31 that are each provided with three wearing face plates and the whole way assembly is mounted on the base member or plate 32 as shown in FIG. 5.

The outer ends of the base member or plate 32 on each side of the machine carry a remote control station 33 that is pivoted at 34 to an extension from the base plate 32. Forward of this downward extension the frame of the base plate 32 is provided with a forward open slot supporting the pulleys 35 at each end of the ways which carry the traversing auger crowd feed chain 36 that is secured at its center to the center of the carriage 37, as the chain travels around the spaced rollers 35 at the ends of the way. The carriage 37 is slid back and forth upon the ways being guided by the inturned opposed flanges 38 and 39, that operate in the outwardly disposed ways 30 and 31. The feed chain 36 is secured to the flange or bracket 43 on the carriage 37 as shown in FIG. 5.

The carriage 37 is actually a little longer than it is wide, and the inturn flanges have a sliding fit on the wearing plates 39 on each of the three faces where they engage in the outwardly open ways grooves 30 and 31 which surfaces are kept oiled. The fact that the carriage 37 is longer than it is wide provides a better sliding engagement owing to the torque forces that are assumed and overcome by this transverse way. The structure as shown provides a least possible resistance although a torque is applied through these surfaces. There is not only a twisting action on the carriage 37, but the carriage has a tendency to lift or be depressed under different augering conditions which, of course, is opposed by the upper and lower wearing plate surfaces 39 in the way grooves 30 and 31.

A motor 40 is mounted on the rear side of the carriage 37 and overhangs the same at considerable extent to counterbalance the weight of the auger drive mechanism 41 that extends toward the front of the machine and is provided with the square hole sleeve 42 for receiving a similarly shaped pin member on the end of the auger to rotate the same. The weight of the motor 40 and the auger drive gear case are selected so as to substantially balance each other insofar as their weight is concerned which is transferred by the inturned flanges 37 and 38 in the way grooves 30 and 31. That portion of the auger drive gear mechanism connected to the sleeve 42 is centered relative to the motor 40 on the carriage 37 as shown in FIG. 1.

Figure 2:
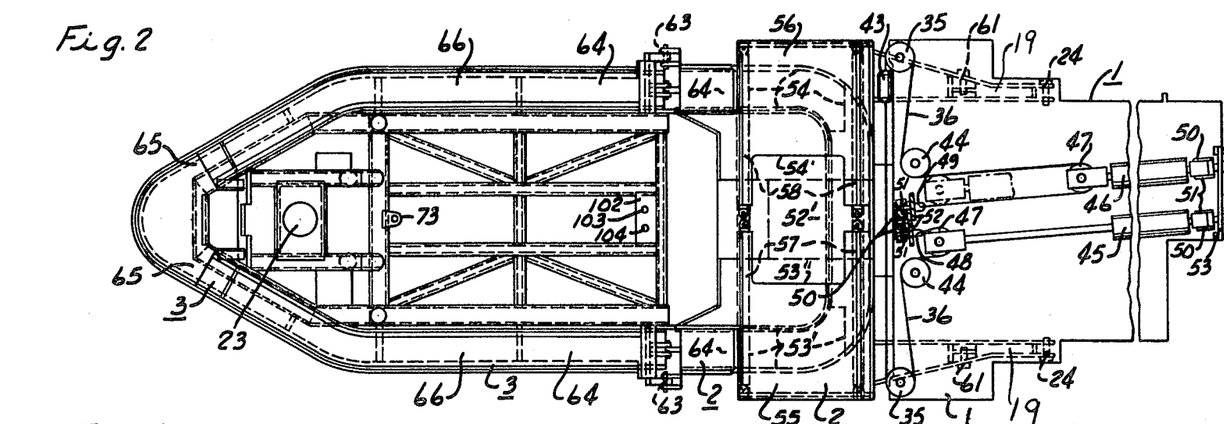
FIG. 2 is a plan view of the mining machine frame.

As shown in FIG. 2 the crowd chain 36 is fastened by the chain bracket 43 to the carriage 37 and this represents the middle of the chain. The opposite ends of the chain passes around the rollers 35 and the rollers 44 to the rollers on the ends of the piston rods operating in the cylinders 45 and 46. The chain end that extends around the pulley 47 on the rod of the cylinder 45 is terminated at 48 whereas the chain 36 passes around the pulley 47 of the rod extending from the cylinder 46 terminates at 49. Each chain terminus 48 and 49 is secured to a clevis bolt and a cup member 50 which has a chamber containing a deformable shock absorbing cushion of elastomer material such as indicated at 51. The clevis on the cup 50 tends to compress the elastomer 51 as it draws it against the plates 52 that are secured to the frame 1. The resilient material 51 functions as a shock absorbing means and it is not only placed in the circuit of the chains 36 but is also employed to fasten the ends of the cylinders 45 and 46 to the plate 53 on the base frame 1, which in effect represents the opposite end of the power means for reciprocating the carriage back and forth on the way 25. As shown in FIG. 2 the piston rod in the cylinder 45 is extended whereas the cylinder 46 has its piston rod retracted placing the chain bracket 43 to the right side of the machine. To move the carriage transversely in the opposite direction, fluid under pressure is inserted in the outer end of the cylinder 45 so as to force its piston rod inwardly which not only pulls the chain and causes the chain bracket to move the carriage from the right to the left side of the machine, but also extends or pulls out the piston rod from the cylinder 46 as it moves therealong until the latter reaches the dotted position at which time the piston rod of the cylinder 45 will be completely retracted.

If the mining head on the auger strikes a sulpher ball or a rock that is materially harder than the material being mined, the shock will be transmitted back through the auger string and the driving mechanism and it will have a tendency to raise or lower the carriage or twist the carriage. This shock is also transmitted through the chain 36 to the crowd cylinders or jacks 45 and 46 and the respective cushion members 51. Thus, these cushions function as a shock absorber between the chain, the frame, the carriage, the drive mechanism, and the auger sections, and thus materially reduce the breakage or destruction of the machine as well as the mining head and augers.

When the piston from the cylinder 46 is extended to the dotted position shown in FIG. 2 and it is desirable to return the carriage to where the chain bracket 43 is again in a position as illustrated in FIG. 2, then the outer or rod end of the cylinder 46 is charged with fluid under pressure to draw in its piston inwardly to the position as shown in full lines of FIG. 2.

Referring to FIG. 2, it will be noted in FIGS. 1 and 2 that the mid frame 2 carried a fixed belly plate 52' which is substantially centered under the axis of the rotary auger drive sleeve 42. This belly plate is provided with an opening adjacent each end thereof as indicated by the dotted lines 53 and 54 which outlines the conveyor openings through the belly plate 52' at each end thereof. Ordinarily these conveyor outlets 53' and 54 are covered by the extendable belly guide plate 55 and 56. These guide plates are extended and retracted by double acting cylinders 57 and 58 until their outer ends engage the face of the material being mined. If the augers are to be operated on the left side of the machine the belly plate guide 55 is pushed outwardly against the face of the mine by the double acting cylinders 57 and the machine should be positioned from the mine face as sufficient distance to allow the end of the extension 55 to uncover the respective conveyor discharge opening by its rear edge of the plate 55 illustrated at 53''. The inner edge of the extension 56 is provided with a cutout 54' to match the discharge openings 53 and 54 in the belly plate 52' of the machine.

As shown in FIGS. 4 and 5 a pair of cylinders 60 are positioned on the inner side of each of the arms 19 that carry the pivot pins 24. Each cylinder is a double acting hydraulic cylinder pivoted at 61 to the mid frame arms 19 and to the main frame at 62 on the base plate 32 behind the cross members 28 under transverse way 25. Thus, the pair of cylinders 60 may raise and lower the whole of the mid frame which would pivot about the pivots 24 for the purpose of adjusting the height of the belly pan 52 and the guide plates 55 and 56 relative to the auger members 85 or the auger drive sleeve 42. This adjustment will, of course, have no effect on the relative position of the transverse way 25 and the auger drive sleeve 42 which are supported from the main frame 1. It does provide for adjustment to accommodate different sized augers, as well as for adjustment in different mining operations.

The mid frame double acting jacks 60 may, of course, be operated whether or not the main frame 1 of the machine is supported on the endless tracks 4 or supported from the lift jacks 20, one set being aft of the center 5 in the main frame and the other set being on the forward end of the mid frame 2 and in front of the auger mining mechanism.

Figure 6:
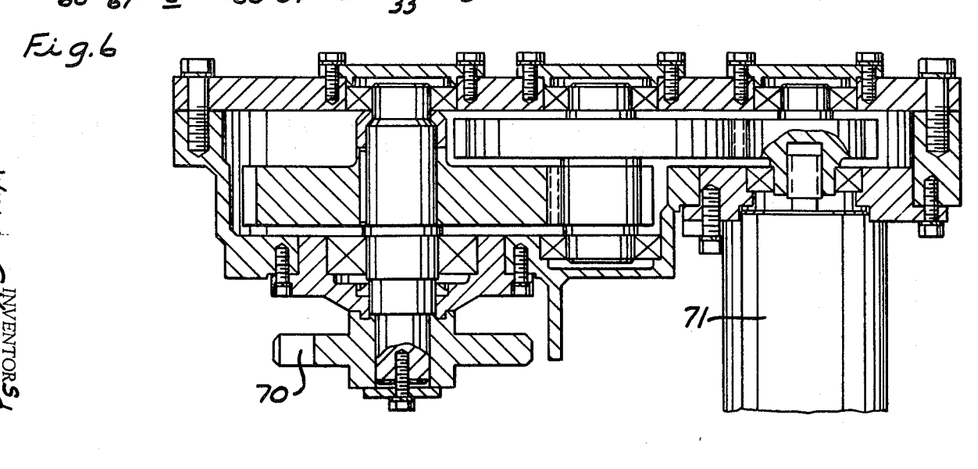
FIG. 6 is a sectional view showing the conveyor driving mechanism.
Figure 7:
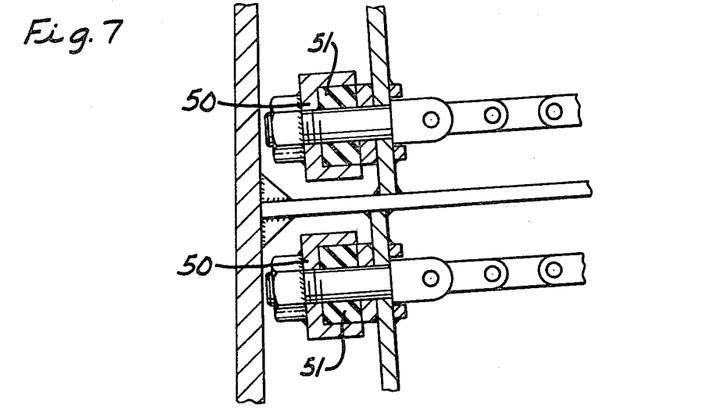
FIG. 7 is a plan view in section showing the feed chain shock absorbing connections of the chain ends made to the main frame of the auger mining machine.

As shown in FIGS. 1 and 3, the front of the mid frame 2 is pivoted to the rear of the front conveyor frame 3 as indicated at 63 on opposite sides of the machine. This pivot, as shown in FIG. 2, is outside of the conveyor path 64, as shown in FIGS. 1 and 2. The conveyor frame has an opening 65 at the front or apex thereof in the bottom of the conveyor pan 66, where the conveyor extends to the mid frame 2 that has similar conveyor pan 66 that passes over and downwardly in a slope as shown in FIG. 4 underneath the belly pan 52 and transversing to the opposite side of the machine and upwardly to the opposite side of the triangular frame 3. It will be noted that the pivots 63 between the mid frame 2 and the conveyor frame 3 are substantially the same elevation as the conveyor so that the hinge conveyor chain 67 with its outwardly extending flights 68 will have pivoted joints added between their links so they may negotiate a change in the flight vertically as well as horizontally. The endless conveyor chain 67 passes around the sprocket 70 which, as shown in FIG. 6, is driven through a train of gears by the motor 71. As illustrated in FIG. 1 the whole drive assembly for the conveyor is adjustable by the bolts 72 to take up on the conveyor drive which extends almost a full circle around the sprocket 70.

The conveyor motor 71 which is preferably a hydraulic motor which may be driven in opposite directions at various speeds for the purpose of operating the endless conveyor chain 67 in either direction at different speeds. If from FIG. 1 the conveyor is operated in a clockwise direction the machine will be augering from the left side and the auger guide mechanism 55 will be extended and the conveyor will be supplied with mined material through the opening 53 for the purpose of carrying the material mined up the incline plane passed the pivot 63 to the discharge 65 at the conveyor apex. It will be noted from FIG. 1 that the conveyor trough is open along each of the sides of the trangularly shaped conveyor so that material mined may be readily scooped from the floor and discharged therein from either side of the machine which is a material advantage during the mining operation and represents a novel object of this invention. The only place that the conveyor remains covered is where it extends across the mid frame underneath the auger mechanism.

It is obvious that since the principal portion of the machine is supported from the ground by the spaced parallel endless tracks 4 and the wheel 23 supports the conveyor at the front of the machine being a caster that the machine may be readily guided and turned within the dimensions of the mine and by reasons of the fact that the caster wheel will readily trail the front of the machine when it is swung by reversing the operation of the spaced endless tracks. This represents a material advancement in the machine in the art and is an important object of this invention.

It should be further noted that since the conveyor frame 3 is substantially triangular in shape the apex or outermost point of the discharge 65 provides greater latitude in operation when steering the mining machine through a labyrinth course in the mine tunnel. It is, of course, materially enhanced by the triangular shape of the forward end of the conveyor frame.

Rearwardly of the conveyor motor drive and the bearing mounting of the caster wheel 23, the conveyor frame is provided with a tubular cross brace member on which is secured a plate for receiving the vertical pivot member 73 as shown in FIGS. 1, 2, 8, 9 and 10. This plate and pivot member supports the front end of the auger storage and loading structure that lies within the loop conveyor on the conveyor frame 3.

The auger storage and loader is supported on the base frame plate 74 to which is secured to the upright members or standards 75 formed with a vertical plate and braced by a wedge or gusset plate. These standards are positioned on each side of the base plate 74 and carry the upper and lower auger supporting chain guide flights 76 which are in the form of parallel channel members, the uppermost of which supports the top flight of the auger supporting chain and the lower ones guide the lower flight of the same chain 77 which extends around the pair of sprockets 78 at the drive end and the pair of sprockets 79 at the auger section loading end.

The drive end of the supporting shaft of the sprockets 78 is supported by the spaced bearings 80 secured to the chain guide 76 and is driven by the shaft mounted drive mechanism 81 actuated by the hydraulic motor 82 and provided with a torque arm that is secured to the drive housing and is connected to the storage frame plate 74 by means of the adjustable link 83. Thus, the motor and drive mechanism 82 and 81 are actually suspended from the shaft carrying the sprockets 78 and its only connection to the frame is through the torque arm and its adjustable link 83.

Figures 8, 9:
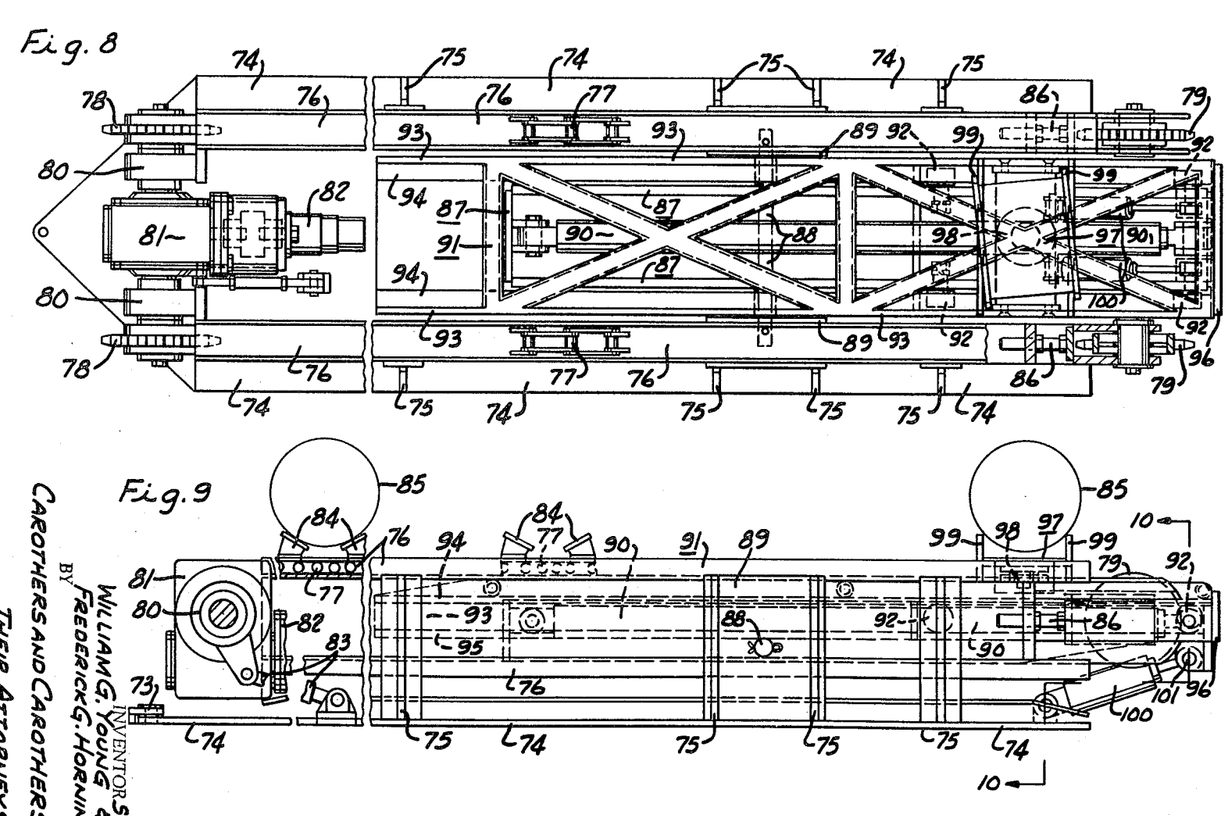
FIG. 8 is a plan view of the auger storage and loading mechanism.
FIG. 9 is a view in side elevation of the auger storage and loading mechanism.

Each of the chains 77 is provided with spaced pairs of opposed pads 84 that are positioned to support the shaft of the auger section 85. Each of the pads of a pair are similarly constructed, but one is turned relative to the other to make their seats opposed for the purpose of receiving and retaining the shaft of an auger. Each pad of a pair of opposed pads 84 is supported from one link end as shown in FIG. 9. There are three links intervening, thus, it requires at least five links of the chain 77 to construct a pair of opposed pads for supporting one end of an auger section 85 or as the case in the present loader the pair of pads on one chain is maintained in alignment by a similar pair of pads on the opposed chain 77 both of which are spaced apart by reason of the flight guide member 76 and their respective sprockets 78 and 79 in alignment therewith. In accordance with the size of the auger sections 85, each pair of support pads are positioned toward or away from each other as shown in FIG. 9 and the present installation requires 10 links in the chain between each pair of pads which of course are usable for augers of smaller diameter. The chain is thus made up to permit the adjacent augers to have their flights engaged with each other as they repose on the auger storage rack as illustrated in FIG. 1. The adjacent auger flights are spaced from the adjacent shaft of the next auger section. When no augers are reposing on the spaced pads 84 the motor 82 may be operated to merely continue the pads in a circular path about the sprockets 78 and 79. The sprockets 79 are mounted in a slidable bearing that is adjustable by the bolts 86 as shown in FIG. 8 to take up the tension in the chain 77 originally and after additional links or pads 84 that may be inserted or removed in the future. Thus, the sprockets 79 which are independently supported on their shaft, the bearing of which is slidable relative to the frame and may be independently adjusted to keep both chains 77 at a proper tightness.

Figure 10:
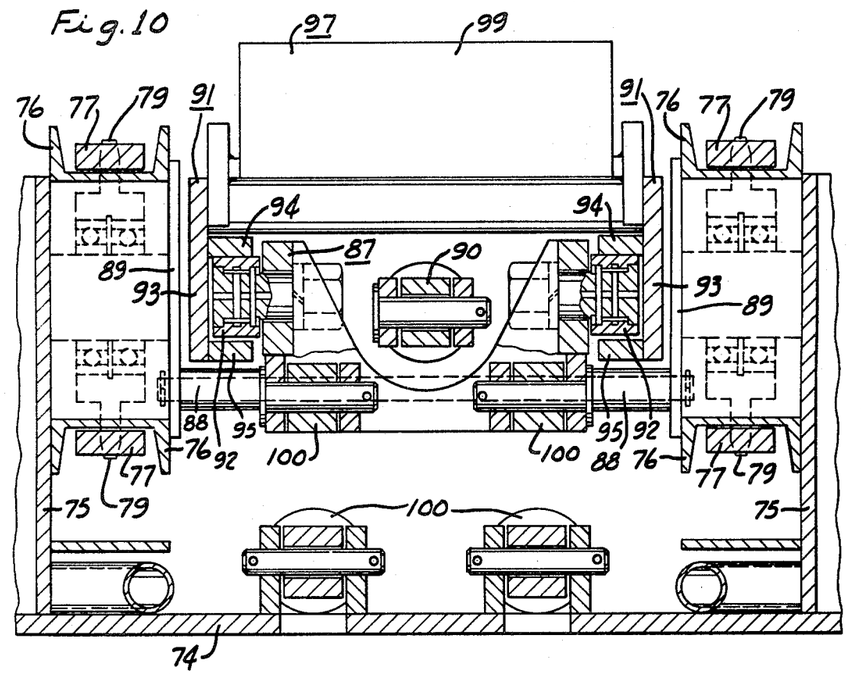
FIG. 10 is a view in vertical section along the lines 10—10 of FIG. 9.
Figure 11:
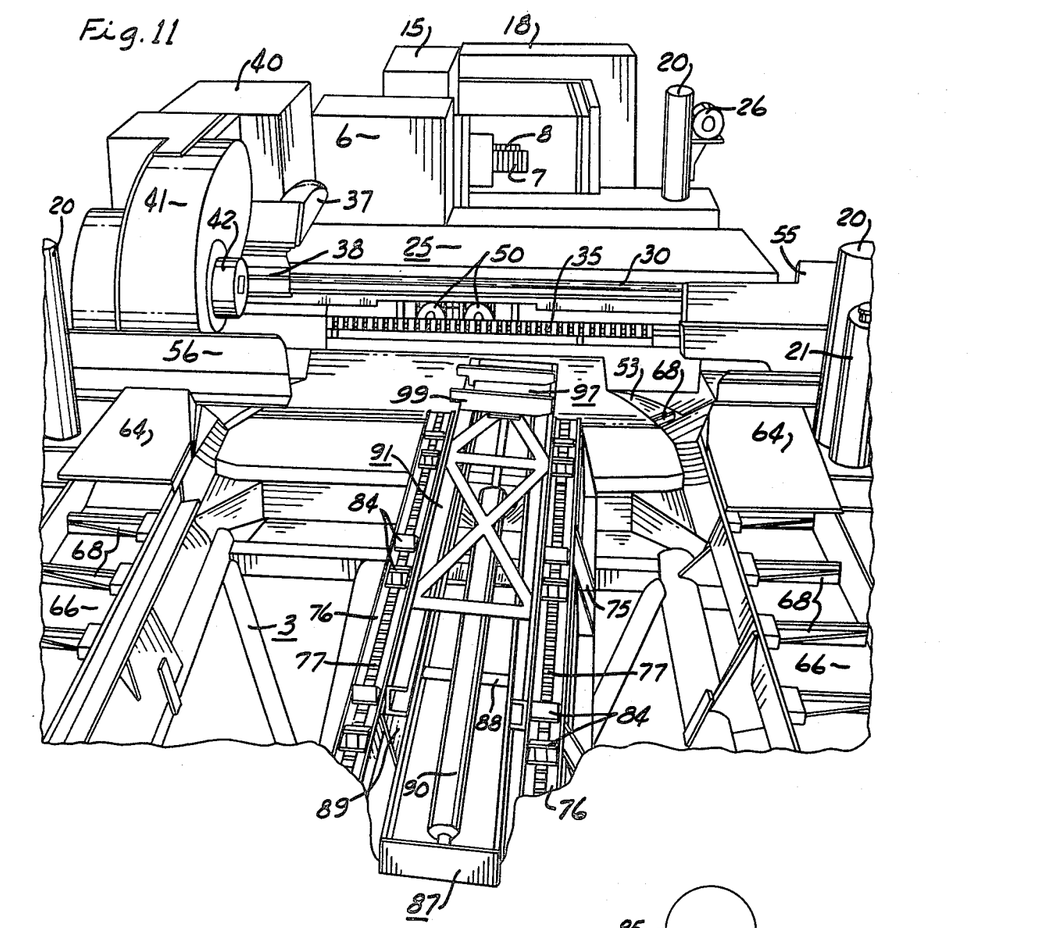
FIG. 11 is a perspective view illustrating the extended auger loader of the front conveyor frame.
Figure 12:
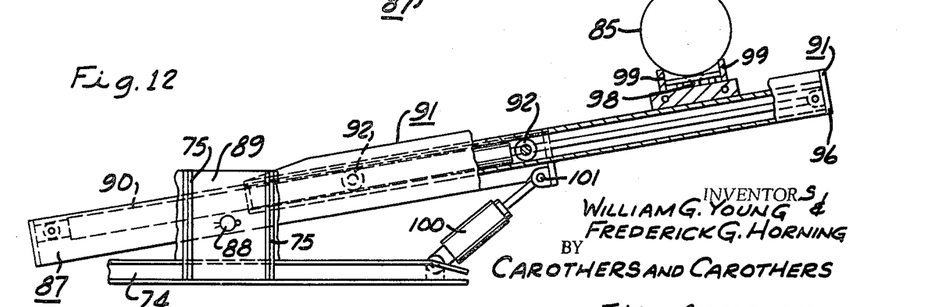
FIG. 12 is a side view partly in section of the tiltable and extensible frames of the auger loader.

As shown in FIGS. 8, 9 and 10, the auger storage rack has two inner movable frames. The innermost frame or tiltable frame 87 is supported from the large transverse pivot rod member 88 that is secured by cotter keys in its opposite ends where it extends through the plates 89 secured to the upper and lower inner face of the guides 76. A spaced tube is positioned on the pivot rod 88 adjacent each side of the frame 87 to center this tiltable frame 87 between flight guides 76 of the storage frame. The end of the frame towards the front of the conveyor is provided with a pivot member to support the double acting cylinder 90 at one end of the piston rod extending out from its other end and is pivotly connected to the forward end of the slidable frame 91. This slidable frame is actually the loading frame for the auger sections and is supported by two pairs of spaced rollers 92 that are carried to the tiltable frame 87 between the pivot rod 88 and the mid frame 2 of the machine. The slidable frame 91 is wholly supported by the rollers 92 from the tiltable frame 78 and thus the slidable frame 91 must tilt with the frame 87 on the pivot 88. The slidable frame 91 is reinforced with a transverse and cross tubes as illustrated in FIG. 8 and its sides are constructed with parallel vertically disposed plates 93 and inturned spaced flanges 94 and 95 which receive the rollers 92 as clearly shown in FIG. 10. These inturned flanges extend from one end of the slidable frame 91 to the other. A face plate 96 closes the loading end of this frame which forms a box that closes over the tiltable frame 87 as shown in FIG. 9.

The top of the slidable frame 91 is provided with a loading seat 97 which is constructed of a cross plate provided with a downwardly extending central pivot 98 and the actual seat is formed by the parallel side plates 99 which support the shaft of the auger section 85. These upwardly projecting parallel side plates 99 form the support for the round shaft of the auger section 85 and they also are of such extent that they will engage the inner side of the plates 93 as shown in FIG. 8 which represents the limit that the seat 97 may be swiveled on the pivot pin 98. Thus, if the seat 97 or the shaft of the auger section 85 are askew to one another, the seat will readily swivel on the pivot pin 98 to align itself in order to be lined up with the adjacent auger section. It will be noted from FIG. 9 that the seat 97 lies between pairs of rollers 92 and when the extensive frame 91 is retracted by the cylinder 90, the conveyor flights help line up the auger section on a pair of adjacent pads 84 when the tilt frame 87 is lowered, permitting the pads 84 to receive the auger section 85 from the loading seat 97.

The auger storage and loader frame plate 74 supports the lower pivoted end of the spaced cylinders 100, the piston of which are pivotally connected at 101 to the tiltable frame 87. As shown in FIG. 9 the piston in the double acting cylinder 100 has been partially extended to support the tiltable frame 87 in a horizontal position. In this position the seat 97 would be just about to engage the shaft of the auger section 85 as indicated in FIG. 9 and further extension of the piston from the double acting cylinder 100 would raise the auger section from the pads 84 on each side of the seat 97; and when the piston of the cylinder 100 is fully extended the auger section would be raised free of the seats 84 and the conveyor 77 at which time the cylinder 90 extends its piston in order to move the sliding frame 91 outwardly on the line of the tilted slope of the frame 87 and thus lift the auger section to its align center position over the side of the belly plate and in alignment with the sleeve 42. When the tiltable frame 87 is raised the auger flights will clear the front of the front side of the belly plate and support the auger section to be added above the square hole in the driving sleeve 42. In this position cylinders 100 on each side of the tiltable frame 87 may be lowered until the pin in the shaft of the auger section 85 is aligned with the sleeve 42 at which time the crowd cylinders 45 and 46 may be actuated to move the sleeve over the pin permitting the pin to be locked therein by a transverse locking pin shown in FIGS. 1 and 5 after which time the cylinders 100 may be fully retracted to lower the slidable frame 91 and when completely lowered the cylinder 90 may be energized to retract its piston and withdraw the sliding frame 91 until its face plate 96 engages the front tiltable frame 87. Thus, the slidable frame 91 is supported solely by the rollers 92 and is connected to the tiltable frame only by the extension and retracted piston from the cylinder 90.

The circuit controlling the loading mechanism is provided with limit switches to energize the motor 82 to move the chain 77 along the frame to bring the next consecutive auger section 85 to the loading seat 97.

The cross frame as shown in FIG. 2 between the parallel sections of the conveyor pan 66 literally slidably supports the frame plate 74 which is pivoted from 73 immediately behind the caster wheel 23. On the opposite end of the conveyor frame 3 there is a plate 102 that has the spaced holes 103 and 104. A bolt 105 that extends downwardly through the plate 74 and when extended through the hole 103 positions the frame plate 74 so that the auger angle as illustrated in FIG. 1 is set for the purpose of drilling off the right side of the machine. If the auger storage frame base plate 74 was swung so that the bolt would extend through the hole as 104 as shown in FIG. 2 then the augers would be disposed on the opposite side of the transverse center of the machine to the same degree as illustrated in FIG. 1. Thus, the base plate 74 is moveable back and forth across the top of the frame as shown in FIG. 2. If by chance the drive or gear case 41 on the carriage were to strike one of the augers on the storage rack it would push the whole frame in the opposite direction of its movement by shearing the bolt that is passed selectively through the holes 103 and 104 which action would give ample warning before damage is wrought on the auger sections or the auger storage and loading mechanism. However, it is preferable to employ a control circuit that prevents the operating of the different parts of the machine by the use of limit switches which require retraction before the next part of the machine may be operated sequentially.

This particular machine has excellent advantages in a deep mine such as a coal mine wherein the main entry is provided with some type of continuous conveyor or has a system whereby it may store and load coal cars for haulage to the cleaning plant. Laterally from the main haulage entry a continuous miner may be employed to cut parallel rooms approximately sixteen feet wide or as wide as the continuous miner will cut, and drive these rooms from three hundred to five hundred feet in depth. These rooms will be as high as the coal permits, and if the rooms are driven at forty-four foot centers, a twenty-eight foot pillar will be left between adjacent rooms.

As a continuous miner is driving the adjacent room will be led by the auger operation to release gas pressure, the augering miner may operate from opposite sides in an adjacent, already cut, entry to cut holes through the last succeeding twenty-eight foot pillar to the next preceding parallel room and at the same time auger the next preceding twenty-eight foot pillar ahead of the continuous miner so as to provide air or release any gas ahead of the continuous miner. The holes bored through the pillar in front of the miner need not be as frequent as the holes bored through the last succeeding pillar as it is believed to space the augering holes ahead of the continuous miner so that when the augering miner returns to the main hall entry, it can drill the intermediate holes for the purpose of recovery before the augering miner leaves the room or entry being thus worked upon.

An expansive belt conveyor or shuttle buggy or other type of coal conveyor may be employed in the rooms to transfer the coal from the auger to the belt conveyor in the main haul line or entry. In this way fresh air may be provided at the face of the continuous miner and the velocity and the volume of air may be determined by the holes allowed to remain open, an inexpensive plug may be obtained to expand in the hole and plug the same to direct the current flow of air through the mine. Again the auger holes through the pillars provide handy places for the storage of timbers and other roof supporting supplies and also provide emergency exits for passing around faults and falls. This machine may be operated efficiently to perform this work whereas it takes considerable time and it is very cumbersome to swing a continuous miner for cutting cross circuits through pillars when the miner is believed best suited to drive and mine the continuous room and entry.

Again the size of the round hole does not appreciably reduce the compressible strength of the pollar and a minimum of pillar between adjacent auger holes can be as small as one and one-half feet between adjacent holes. The auger machine being a considerably simpler machine with less parts than that of a miner can more efficiently cut the pillars between adjacent rooms and increase the efficiency of mining than by the same or another continuous miner.

We claim:

1. An auger mining machine having a main frame including a mid frame and supported on independently operable propulsion mechanism with quadrangularly disposed jacks to raise the machine above the ground surface to support and position a rotary auger mining mechanism with a rotary drive movable by a feeding mechanism to mine in either direction laterally of a pan on said mid frame and deliver the mine material to the mine face, extendable and retractable guide plates slidably supported to move laterally in either direction on said pan, double acting cylinders supported on said mid frame to independently move the guide plates for supporting the auger mining mechanism in the lateral direction of mining.

2. The auger mining machine of claim 1 wherein said mid frame is pivoted to the rear portion of said main frame, and means to raise and lower said mid frame relative to said main frame and to said auger drive.

3. The auger mining machine of claim 1 characterized by transverse ways on said main frame adjacent said mid frame and including outwardly facing grooves, a carriage having a sliding fit in said grooved ways, an auger drive motor on said carriage projecting outwardly on one side of said carriage and said auger mining mechanism rotary drive extending outwardly and downwardly on the other side of said carriage to receive said mining mechanism and connected to said auger drive motor and including a drive socket, a feed chain secured to said carriage and extending in opposite directions, and feed motor means mounted on the rear portion of said main frame to operate said feed chain and said carriage along said ways to feed and retract said auger mining mechanism laterally.

4. The auger mining machine of claim 3 wherein said feed motor means includes a pair of single acting hydraulic cylinders with fastening means to secure the same to said main frame, a piston rod pulley for each cylinder around which the opposite portions of said feed chain extend, an elastomer cushion fastened to said main frame for securing ends of said chain to said main frame after passing through their respective piston rod pulley to absorb the mining operation shocks transmitted to said carriage.

5. The auger mining machine of claim 4 which also includes an elastomer cushion in said fastening means for securing the end of each hydraulic cylinder to said main frame.

6. The auger mining machine of claim 1 characterized by a conveyor frame pivoted at one end to said mid frame and having a mobile support at its other end, an endless drag loop conveyor circulating through said conveyor frame and said mid frame under the pan of the latter, spaced discharges in said pan for conveying mine material to said conveyor as it travels through said mid frame, and a conveyor discharge in said conveyor frame spaced from said mid frame, said extensible and retractable guide plates opening their respective pan discharge to said conveyor when extended.

7. The auger mining machine of claim 6 wherein said endless drag conveyor is a single loop flat chain conveyor with pivoted links permitting it to traverse horizontal and vertical turns as it passes to and through said mid frame.

8. The auger mining machine of claim 6 wherein said pan in said mid frame covers said conveyor which traverses from one side of said conveyor frame past the pivotal axis between said mid frame and said conveyor frame and moves down under said pan and turns to traverse the other side of said mid frame and turns again to move under said pan passing the pivotal axis between said conveyor frame and said mid frame to the point of discharge of said conveyor.

9. The auger mining machine of claim 6 wherein said mobile support of said conveyor frame is a caster mounted wheel steered by said independently operated propulsion mechanism.

10. The auger mining machine of claim 6 wherein said conveyor discharge is a turn at the end of said conveyor frame beyond the point of said mobile support.

11. The auger mining machine of claim 10 characterized by jack means on said mobile support to raise and lower said conveyor discharge.

12. The auger mining machine of claim 6 wherein said conveyor frame supports an auger loading and storing means within the circle of said traveling loop conveyor and includes a rack frame rotatably supporting a pair of spaced sprockets at each end thereof, a parallel endless chain on two aligned sprockets on each side of said frame, a series of aligned cooperative pads on each chain to support a plurality of auger sections, motor means connected to both sprockets at one end to drive said chains in unison in either direction, transfer means on said rack frame between said chains and having a seat to engage under the foremost auger on said aligned pads adjacent said mid frame, and means on said rack frame to raise and extend and lower an auger section on said seat to deposit the same for coupling to said auger mining mechanism and to withdraw the same to return to said rack frame, said means reversing the steps to return each auger section to said aligned pads after being uncoupled from said auger mining mechanism.

13. The auger mining machine of claim 12 wherein said rack frame has one end pivoted to said conveyor frame for angular positioning toward either side of said mid frame to aid in depositing and raising said auger sections to and from said auger mining positioning.

14. The auger mining machine of claim 12 wherein control means are connected to said sprocket motor means to progressively move said pairs of pads a distance equal to the distance between said pairs of pads to successively supply or restore auger sections between said rack frame and said auger mining mechanism.

References Cited

UNITED STATES PATENTS

| | | | |
|---|---|---|---|
| 1,200,205 | 10/1916 | Kuhn | 299—18 |
| 1,445,085 | 2/1923 | Joy | 299—56 |
| 1,815,981 | 7/1931 | Levin | 299—66 |
| 3,091,439 | 5/1963 | Adams et al. | 299—31 |
| 3,158,211 | 11/1964 | McCue et al. | 175—85 |

FOREIGN PATENTS

| | | |
|---|---|---|
| 556,484 | 6/1953 | Canada. |
| 166,288 | 12/1964 | U.S.S.R. |

ERNEST R. PURSER, *Primary Examiner.*

UNITED STATES PATENT OFFICE
CERTIFICATE OF CORRECTION

Patent No. 3,395,940                                August 6, 1968

William G. Young et al.

It is certified that error appears in the above identified patent and that said Letters Patent are hereby corrected as shown below:

Column 11, line 21, "privoted" should read -- pivoted --.
Column 12, line 29, "positioning" should read -- mechanism --.

Signed and sealed this 23rd day of December 1969.

(SEAL)
Attest:

Edward M. Fletcher, Jr.
Attesting Officer

WILLIAM E. SCHUYLER, JR.
Commissioner of Patents